United States Patent [19]
Bahadur et al.

[11] Patent Number: 6,054,549
[45] Date of Patent: Apr. 25, 2000

[54] ALKENYL ETHER FUNCTIONAL POLYISOBUTYLENES AND METHODS FOR THE PREPARATION THEREOF

[75] Inventors: Maneesh Bahadur; Toshio Suzuki, both of Midland, Mich.

[73] Assignees: Dow Corning Asia, Ltd., Tokyo, Japan; Dow Corning Corporation, Midland, Mich.

[21] Appl. No.: 09/200,038

[22] Filed: Nov. 25, 1998

[51] Int. Cl.[7] ..................................................... C08G 77/38
[52] U.S. Cl. ................... 528/29; 528/25; 528/18; 528/19; 528/15; 528/17; 528/14; 528/23; 525/474; 524/490; 524/464; 524/547
[58] Field of Search ................... 528/25, 29, 18, 528/19, 15, 23, 17, 14; 524/490, 464, 547; 525/474

[56] References Cited

U.S. PATENT DOCUMENTS

| | | | |
|---|---|---|---|
| 4,617,238 | 10/1986 | Crivello et al. | 428/452 |
| 4,808,664 | 2/1989 | Saam | 525/106 |
| 4,904,732 | 2/1990 | Iwahara et al. | 525/100 |
| 5,270,423 | 12/1993 | Brown et al. | 528/15 |
| 5,594,042 | 1/1997 | Glover et al. | 522/31 |
| 5,629,095 | 5/1997 | Bujanowski et al. | 428/447 |
| 5,665,823 | 9/1997 | Saxena et al. | 525/106 |

FOREIGN PATENT DOCUMENTS

| | | |
|---|---|---|
| 462389 | 5/1991 | European Pat. Off. . |
| WO 9104992 | 11/1989 | WIPO . |
| WO 9211295 | 12/1991 | WIPO . |

OTHER PUBLICATIONS

Liao et al. "Polymer Bulletin." V. 6, 1981, pp. 135–141.
Kennedy et al. "Polymer Materials Science and Engineering." V. 58, 1998, p. 866.
Kennedy et al. "Journal of Polymer Science: Part A: Polymer Chemistry." V. 28, 1990, p. 89.
Merrill et al. "RadTech North America Proceedings." V1, 1992, pp. 77–85.
Blyler et al. "Polymer for Coating Optical Fibers," Chemtech, 1987, pp. 680–684.
Hitchcock et al. "Agnew. Chem. Int. Ed. Engl.," 1991, pp. 438–440.

*Primary Examiner*—Robert A. Dawson
*Assistant Examiner*—KwoLiang Peng
*Attorney, Agent, or Firm*—Timothy J. Troy

[57] ABSTRACT

This invention relates to alkenyl ether functional polyisobutylenes. This invention also relates to a method of making alkenyl ether functional polyisobutylene polymers comprising reacting a mixture comprising an alkoxysilyl-functional polyisobutylene polymer, an alkenyl ether compound, and a transesterification catalyst. This invention also relates to a method of making an alkenyl ether functional polyisobutylene polymer comprising reacting a mixture comprising a polyisobutylene containing at least one hydrolyzable group, an alkenyl ether compound, and a solvent. The alkenyl ether functional polyisobutylenes of this invention have high moisture vapor barrier, high damping characteristics, and a high refractive index.

29 Claims, No Drawings

ALKENYL ETHER FUNCTIONAL POLYISOBUTYLENES AND METHODS FOR THE PREPARATION THEREOF

FIELD OF THE INVENTION

This invention relates to alkenyl ether functional polyisobutylenes. More particularly, this invention relates to alkenyl ether functional polyisobutylene polymers and methods of making alkenyl ether functional polyisobutylene polymers. The polyisobutylenes of this invention find utility as components in curable compositions in the form of coatings, sealants, caulks, adhesives and paints.

BACKGROUND OF THE INVENTION

Polyisobutylenes containing functional groups which are radiation curable have been disclosed in the art. For example, T. P. Liao and J. P. Kennedy in *Polymer Bulletin*, V. 6, pp. 135–141 (1981) disclose acryl and methacryl telechelic polyisobutylenes having the formula $CH_2=C(R)-COO-PIB-OOC-C(R)=CH_2$ where R is $-H$ or $CH_3$. These materials were prepared by reacting alpha, omega di-hydroxypolyisobutylene, $HOCH_2-PIB-CH_2OH$, and excess acryloyl or methacryloyl chloride. These prepolymers are disclosed as being useful in the synthesis of a variety of new composites containing a soft polyisobutylene segment.

J. P. Kennedy and B. Ivan in *Polymer Material Science and Engineering*, V. 58, p.866 (1988) disclose allyl telechelic linear and star-branched polyisobutylenes prepared by a convenient rapid one pot polymerization functionalization process. The polymerization step involved living polymerization of isobutylene by recently discovered mono- or multifunctional initiating systems (combinations of tert.-ester and ether/Lewis acids) followed by electrophilic functionalizations by allyltrimethylsilane in the presence of $TiCl_4$. Characterization indicated quantitative end allylations. Subsequent quantitative derivations of the allyl termini yielded mono-, di-, and tri-functional hydroxyl- and epoxy-telechelic polyisobutylenes which could be cured to rubbery networks.

J. P. Kennedy and B. Ivan in the *Journal of Polymer Science*, Part A, *Polymer Chemistry*, V. 28, p. 89 (1990) disclose mono-, di-ended linear, and three-arm star allyl telechelic polyisobutylenes which are prepared by a rapid economical one-pot polymerization-functionalization process. The process involved the living polymerization of isobutylene by mono-, di-, or tri-functional initiating systems, specifically by aliphatic and aromatic tert-ester and -ether/$TiCl_4$ combinations, followed by electrophilic functionalization of the living sites with allyltrimethylsilane. Quantitative derivations of the ally termini yielded mono-, di-, and tri-epoxy and -hydroxy-telechelic polyisobutylenes. It is further disclosed that strong rubbery networks were made by curing the epoxy-telechelic polyisobutylenes with triethylene tetramine and by reacting the hydroxy-telechelic polyisobutylenes with MDI.

N. A. Merrill, I. J. Gardner, and V. L. Hughes in RadTech North America Proceedings, V. 1, pp. 77–85 (1992) disclose conjugated diene functional polyisobutylenes which have a high reactivity to both ultraviolet and electron beam radiation. These conjugated diene functional polyisobutylenes, alone or in a formulation, are disclosed as being useful in preparing pressure sensitive adhesives.

In PCT Patent Publication No. WO 9104992 is disclosed a functionalized copolymer of isobutylene and a para-methylstyrene, wherein at least one type of functional group is attached to the para-methyl group of the para-methylstyrene, the copolymer having a substantially homogenous compositional distribution. The functionalized groups are exemplified by alkoxides, phenoxides, carboxylates, thiolates, thiopenolates, thioethers, thiocarboxylates, dithiocarboxylates, thioureas, dithiocarbamates, xanthanates, thiocyanates, silanes, halosilanes, malonates, cyanides, amides, amines, carbazoles, phthalimides, pyridine, maleimide, cyanates, and phosphines.

In PCT Patent Publication No. WO 9211295 is disclosed a radiation reactive functionalized polymer comprising an isoolefin having about 4 to about 7 carbon atoms and a para-alkylstyrene, wherein a radiation reactive functional group is attached to the para-alkyl group of the para-alkylstyrene, and discloses radiation curable pressure sensitive adhesives comprising the functionalized polymer and a tackifier. In WO'295, the radiation curable groups are disclosed as being groups such as thioxanthones, acrylates, aldehydes, ketones, and esters.

Saxena et al. in U.S. Pat. No. 5,665,823 disclose a method for preparing an acrylic functional polyisobutylene polymer or copolymer, the method comprising reacting a polyisobutylene polymer or copolymer which contains at least one carbon-bonded silanol group in its molecule with a silane having both an acrylic-containing group and a silicon-bonded hydrolyzable group in its molecule.

Furthermore, radiation curable compositions which contain alkenyl ether functional organosilicon compounds have also been described in the art. For example, Crivello in U.S. Pat. No. 4,617,238 discloses a photopolymerizable composition comprising (a) an organopolysiloxane having at least one Si-bonded vinyloxy functional group of the formula $H_2C=CH-O-G-$, where G is alkylene (such as propylene) or alkylene interrupted by at least one divalent heteroradical selected from $-O-$, divalent phenylene, or substituted divalent phenylene, or combination of such heteroradicals, and (b) an onium salt catalyst. The '238 patent also describes a method wherein the vinyl ether group is introduced into the organopolysiloxane by addition (hydrosilylation) of compounds with an allyl and a vinyl ether group to an SiH group of the organopolysiloxane in the presence of a platinum catalyst. In the method of the '238 patent, only the allyl group is added to the SiH group while the vinyl ether group is preserved and thus only one vinyl ether group for each SiH group can be incorporated into the siloxane molecule at any given time.

European Patent Publication No. 0462389 teaches thermosetting organopolysiloxanes with oxyalkylene vinyl ether groups bonded by SiOC groups and the vinyl groups may be substituted by alkyl groups. EPO'389 also teaches a method for the preparation of these compounds and their application as photochemically thermosetting polysiloxanes in encapsulating compounds, as non-stick coating compounds for flat carriers or as modified additives in compounds which can be thermoset radically, cationically or by UV or electron radiation.

Brown et al., in U.S. Pat. No. 5,270,423 disclose organosilicon compounds with a siloxane portion of the general formula $-OR'OCH=CHR''$ linked via an SiOC bond wherein R' is a divalent hydrocarbon group and R'' is hydrogen or an alkyl group which are useful in radiation curable compositions, in which they are mixed with an initiator. The compositions are particularly useful in UV radiation curable coatings.

Glover et al. in U.S. Pat. No. 5,594,042 disclose radiation curable compositions comprising vinyl ether functional siloxanes and aromatic iodonium salt or aromatic sulfonium salt photoinitiators which cure upon exposure to ultraviolet or electron beam radiation. The vinyl ether groups are linked to the silicon atom on the siloxane through an SiOC bond and the photoinitiators are disclosed as being preferably either diaryliodonium salts of sulfonic acids or triarylsulfonium salts of sulfonic acids.

Bujanowski et al. in U.S. Pat. No. 5,629,095 disclose vinyl ether functional siloxane resins, radiation curable coating compositions comprising a vinyl ether functional siloxane resin and a photocleavable acid, and a coated article obtained by applying the radiation curable coating composition to a substrate and then exposing the coating to radiation in an amount sufficient to cure the coating. In the '095 patent, the vinyl ether group in the siloxane resin is attached to the silicone atom through an SiOC bond.

SUMMARY OF THE INVENTION

The present invention relates to alkenyl ether functional polyisobutylenes.

This invention also relates to a method of making alkenyl ether functional polyisobutylene polymers in which at least 50 mole percent of the repeat units are isobutylene units comprising reacting a mixture comprising an alkoxysilyl-functional polyisobutylene polymer, an alkenyl ether compound, and a transesterification catalyst.

This invention also relates to a method of making an alkenyl ether functional polyisobutylene polymer in which at least 50 mole percent of the repeat units are isobutylene units comprising reacting a mixture comprising a polyisobutylene containing at least one silicon-bonded hydrolyzable group, an alkenyl ether compound, and a solvent.

It is an object of this invention to produce alkenyl ether functional polyisobutylenes which are useful in radiation curable coatings.

It is an object of this invention to produce alkenyl ether functional polyisobutylenes having high moisture vapor barrier, high damping characteristics, and a high refractive index.

DETAILED DESCRIPTION OF THE INVENTION

In a first embodiment, this invention relates to an alkenyl ether-functional polyisobutylene polymer in which at least 50 mole percent of the non-terminal repeating units of the polymer are isobutylene units and containing at least one group having the formula

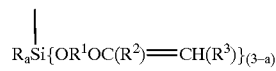

wherein R is independently selected from the group consisting of monovalent hydrocarbon groups and alkoxy groups, $R^1$ is a divalent hydrocarbon group having from 2 to 20 carbon atoms, $R^2$ and $R^3$ are independently selected from a group consisting of a hydrogen atom and a monovalent hydrocarbon group and a has a value of 0 to 2.

The monovalent hydrocarbon groups of R are exemplified by alkyl groups such as methyl, ethyl, propyl, butyl, hexyl, octyl, and decyl, aryl groups such as phenyl, tolyl, and xylyl, and can also be any monovalent hydrocarbon group which has at least one of its hydrogen atoms replaced with a halogen, such as fluorine, chlorine, or bromine, and these monovalent hydrocarbon groups are exemplified by $CF_3CH_2CH_2$— and $C_4F_9CH_2CH_2$—. The alkoxy groups are exemplified by methoxy, ethoxy, propoxy, and butoxy. It is highly preferred that R is independently selected from the group consisting of methyl and methoxy. Each R group can be the same or different, as desired.

Divalent hydrocarbon groups suitable as $R^1$ are exemplified by alkylene groups such as ethylene, propylene, butylene, pentylene, trimethylene, 2-methyltrimethylene, pentamethylene, hexamethylene, 3-ethyl-hexamethylene, octamethylene, decamethylene, —$(CH_2)_{18}$—, and cycloalkylene groups such as cyclohexylene, arylene groups such as phenylene, combinations of divalent hydrocarbon groups such as benzylene. Examples of suitable divalent halohydrocarbon groups also include any divalent hydrocarbon group wherein one or more hydrogen atoms have been replaced by halogen, such as fluorine, chlorine or bromine exemplified by —$CH_2CH_2CF_2CF_2CH_2CH_2$—. Each $R^1$ can be the same or different as desired. Preferably $R^1$ is butylene.

The groups $R^2$ and $R^3$ may be either a hydrogen atom or a monovalent hydrocarbon group exemplified by alkyl groups such as methyl, ethyl, propyl, butyl. The groups $R^2$ and $R^3$ may be the same or different. Preferably $R^2$ and $R^3$ are hydrogen atoms.

In the formula above, it is preferred that a have a value of zero.

For the purposes of this invention, the backbone of the alkenyl ether functional polyisobutylene polymer may be any linear or branched polymer or copolymer wherein at least about 50 mole percent, preferably at least 80 mole percent, of the repeat units are isobutylene units having the following structure:

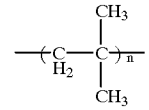

In the polymer or copolymer of the invention, the above described alkenyl ether group can be disposed either along the chain or at the terminals thereof, or any combination of the above. As used herein, the term "polymer" is generic to polymers, oligomers, and copolymers, all of which are within the scope of this invention.

In a preferred embodiment of this invention, the alkenyl ether functional polyisobutylene polymer is a polymer containing at least one group having the formula

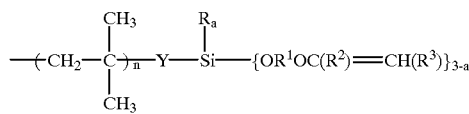

wherein at least 50 mole percent of the non-terminal repeating units of the polymer are isobutylene units, R is independently selected from the group consisting of monovalent hydrocarbon groups and alkoxy groups, $R^1$ is a divalent hydrocarbon group having from 2 to 20 carbon atoms, $R^2$ and $R^3$ are independently selected from a group consisting of a hydrogen atom and a monovalent hydrocarbon group, n has a value from 5 to 10,000, a has a value of 0 to 2, and Y is selected from the group consisting of (i) an alkylene group having from 2 to 10 carbon atoms and (ii) a group having the formula

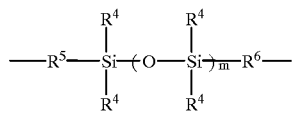

wherein $R^4$ is independently a monovalent hydrocarbon group, $R^5$ and $R^6$ are independently alkylene groups having from 2 to 10 carbon atoms, and m is an integer having a value of from 1 to 5.

The groups R and $R^1$ are as defined hereinabove, including preferred embodiments thereof. Preferably, R is independently selected from the group consisting of methyl and methoxy, and $R^1$ is butylene. Preferably, a has a value of 0 or 1.

The alkylene groups of Y(i) are exemplified by ethylene, propylene, butylene, pentylene, trimethylene, 2-methyltrimethylene, pentamethylene, hexamethylene, 3-ethyl-hexamethylene, octamethylene, and decamethylene.

In the formula for Y(ii) above, the monovalent hydrocarbon groups of $R^4$ are as described above for R, and preferably $R^4$ is methyl. The alkylene groups for $R^5$ and $R^6$ are as defined above for Y(i). Preferably, $R^5$ and $R^6$ are independently selected from the group consisting of ethylene and propylene. It is highly preferred that $R^5$ is propylene, and $R^6$ is ethylene. It is also preferred that m has a value of 1.

In a second embodiment, this invention relates to a method of making an alkenyl ether functional polyisobutylene polymer in which at least 50 mole percent of the non-terminal repeating units of the polymer are isobutylene units, the method comprising (I) reacting a mixture comprising: (A) a polyisobutylene polymer containing at least one group having the formula

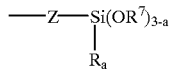

wherein at least 50 mole percent of the non-terminal repeating units of the polymer are isobutylene units, $R^7$ is an alkyl group having from 1 to 5 carbon atoms, R is independently a monovalent hydrocarbon group, a has a value of 0 to 2, and Z is selected from the group consisting of (i) an alkylene group having from 2 to 10 carbon atoms and (ii) a group having the formula

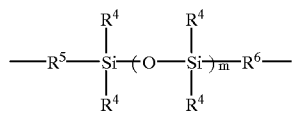

wherein $R^4$ is independently a monovalent hydrocarbon group, $R^5$ and $R^6$ are independently alkylene groups having from 2 to 10 carbon atoms, and m is an integer having a value of from 1 to 5, (B) an alkenyl ether compound having the formula $HOR^1OC(R^2)=CH(R^3)$ wherein $R^1$ is a divalent hydrocarbon or halohydrocarbon group having from 2 to 20 carbon atoms, $R^2$ and $R^3$ are independently selected from a group consisting of a hydrogen atom and a monovalent hydrocarbon group, and (C) a transesterification catalyst. The reaction mixture can further comprise a nonpolar solvent. The reaction mixture can also further comprise an alkoxysilane. The method can further comprise removing volatiles from the product of (I).

Reacting for the purposes of this invention denotes simply mixing components (A), (B), and (C), and any optional components at room temperature (about 25° C.) or heating a mixture of components (A)–(C) and any optional components at temperatures above room temperature. Preferably a mixture of components (A)–(C) and any optional components are heated at a temperature of from 40 to 150° C.

The monovalent hydrocarbon groups for $R^4$ are as described hereinabove including preferred embodiments thereof. Preferably $R^4$ is methyl.

The alkylene groups for $R^5$ and $R^6$ are as described hereinabove including preferred embodiments thereof. Preferably $R^5$ and $R^6$ is selected from the group consisting of ethylene and propylene. It is highly preferred that $R^5$ is propylene, and $R^6$ is ethylene.

The group $R^7$ in the above formula for (A) is exemplified by methyl, ethyl, propyl, butyl, and pentyl. Preferably $R^7$ is methyl. It is preferred that m have a value of 1.

Preferably, the polyisobutylene polymer of component (A) has a number average molecular weight of from 500 to 100,000, and especially from 1,000 to 20,000 based on their case of handling.

The polyisobutylene polymers of component (A) and their method of preparation are disclosed in U.S. Pat. Nos. 4,808,664 and 4,904,732, incorporated herein by reference to teach polyisobutylene polymers suitable as component (A), and the method for their preparation.

Preferably, the polyisobutylene polymer of component (A) is a polymer containing at least one group having the formula

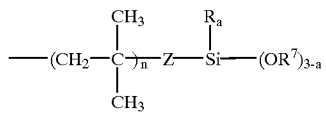

wherein R is independently a monovalent hydrocarbon group, $R^7$ is an alkyl group having from 1 to 5 carbon atoms, n has a value from 10 to 2,000, a has a value of 0 to 2, and Z is selected from the group consisting of (i) an alkylene group having from 2 to 10 carbon atoms and (ii) a group having the formula

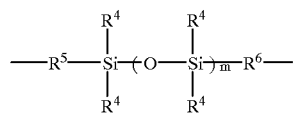

wherein $R^4$ is independently a monovalent hydrocarbon group, $R^5$ and $R^6$ are independently alkylene groups having from 2 to 10 carbon atoms, and m is an integer having a value of from 1 to 5.

The monovalent hydrocarbon groups of R and $R^4$ are as defined hereinabove, including preferred embodiments thereof. Preferably, R and $R^4$ are methyl. The alkyl groups of $R^7$ are as defined above, preferably $R^7$ is methyl. The alkylene groups of Z(i) are exemplified by ethylene, propylene, butylene, pentylene, trimethylene, 2-methyltrimethylene, pentamethylene, hexamethylene, 3-ethyl-hexamethylene, octamethylene, and decamethylene.

The alkylene groups for $R^5$ and $R^6$ are as defined above for Z(i). Preferably, $R^5$ and $R^6$ are independently selected from the group consisting of ethylene and propylene. It is highly preferred that $R^5$ is propylene, and $R^6$ is ethylene. It is also preferred that m has a value of 1, and a has a value of 0.

It is preferred for the purpose of this invention, that the number of moles of component(B) is equal to or as close as possible to the number of moles of the Si(OR⁷) functional group in component A.

Component (B) is an alkenyl ether compound having the formula HOR¹OC(R²)=CH(R³) wherein R¹ is a divalent hydrocarbon or halohydrocarbon group having from 2 to 20 carbon atoms. Divalent hydrocarbon groups suitable as R¹ are exemplified by alkylene groups such as ethylene, propylene, butylene, pentylene, trimethylene, 2-methyltrimethylene, pentamethylene, hexamethylene, 3-ethyl-hexamethylene, octamethylene, —(CH₂)₁₈—, and cycloalkylene groups such as cyclohexylene, arylene groups such as phenylene, combinations of divalent hydrocarbon groups such as benzylene. Examples of suitable divalent halohydrocarbon groups also include any divalent hydrocarbon group wherein one or more hydrogen atoms have been replaced by halogen, such as fluorine, chlorine or bromine exemplified by —CH₂CH₂CF₂CF₂CH₂CH₂—. Each R¹ can be the same or different as desired. Preferably R¹ is butylene.

The groups R² and R³ may be either a hydrogen atom or a monovalent hydrocarbon group exemplified by alkyl groups such as methyl, ethyl, propyl, butyl. The groups R² and R³ may be the same or different. Preferably R² and R³ are hydrogen atoms.

It is preferred for the purposes of this invention that the number of moles of alkenyl ether groups be equal to the number of moles of the Si(OR⁷) functional groups, that is the number of moles of component (B) is equal to or as close as possible to the number of moles of the Si(OR⁷) functional groups.

Component (C), the transesterification catalyst, is exemplified by alkali metal alkoxides, Sn compounds, Ti compounds, Zn compounds, Ba compounds, as well as standard strong alkali compounds. Strong acid compounds are to be avoided as they tend to polymerize oxyalkenyl groups. Examples of suitable transesterification catalysts include dimethyltin neodecanoate, dibutyltin diacetate, dibutyltin dilaurate, dioctyltin dilaurate, dibutyltin dioctoate, zinc napthenate, cobalt napthenate, zinc octylate, tin octylate, cobalt octylate, diisooctyl mercaptoacetate, zirconium napthenate, zirconium octylate, tetrabutyl titanate, tetraisopropyl titanate, barium hydroxide monohydrate, and other organic metal catalysts. It is preferred for the purposes of this invention that the transesterification catalyst be selected from alkoxides such as tetraisopropyl titanate, barium hydroxide monohydrate, and sodium methoxide.

The amount of transesterification catalyst needed for the method of the present invention will be determined by the skilled artisan through routine experimentation. Typically, this component is employed at a level of from about 50 parts per million (ppm) to about 100,000 ppm, preferably from about 50 ppm to about 1000 ppm.

The mixture of step (I) can further comprise a nonpolar solvent. The nonpolar solvent is exemplified by aliphatic hydrocarbons such as pentane, cyclopentane, hexane, cyclohexane, heptane, octane, and nonane, aromatic hydrocarbons such as benzene, toluene, and xylene, and halogenated solvents such as fluorine-, chlorine-, and bromine-substituted aliphatic or aromatic hydrocarbons such as perchloroethylene, and bromobenzene. Two or more nonpolar solvents may be used together.

The amount of nonpolar solvent is not critical and may be readily determined by one skilled in the art. The compositions of this invention may contain up to 0–100 parts by weight of the nonpolar solvent per 100 parts by weight of the polymer, however it is preferred that from about 50 to 100 parts by weight be employed per 100 parts by weight of the polymer.

The method of this invention can further comprise removing volatiles from the product of (I). Methods of removing volatile components are well known in the art and need no extensive delineation herein. Any method of removing volatile components can be used in the present invention, such methods exemplified by heating, heating and applying a vacuum, rotoevaporators, thin film strippers, wiped film evaporators, or a combination thereof. It is preferred in the method of this invention that the volatiles are removed by heating the product of (I) to a temperature of from 50 to 150° C. under a vacuum of approximately 20–100 mm Hg.

In a third embodiment, this invention relates to a method of making an alkenyl ether functional polyisobutylene polymer in which at least 50 mole percent of the non-terminal repeating units of the polymer are isobutylene units, the method comprising (I) reacting a mixture comprising: (A') a polyisobutylene polymer containing at least one group having the formula

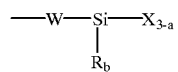

wherein at least 50 mole percent of the non-terminal repeating units of the polymer are isobutylene units, X is a hydrolyzable group selected from the group consisting of a halogen atom, an acyloxy group, a ketoxymate group, an amino group, an amido group, and an aminoxy group, R is independently a monovalent hydrocarbon group, b has a value of 0 to 2, and W is selected from the group consisting of (i) an alkylene group having from 2 to 10 carbon atoms and (ii) a group having the formula

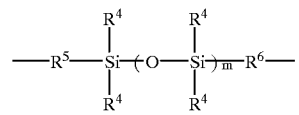

where R⁴ is a monovalent hydrocarbon group, R⁵ and R⁶ are independently alkylene groups having from 2 to 10 carbon atoms, and m is an integer having a value of from 1 to 5, (B') an alkenyl ether compound having the formula HOR¹OC (R²)=CH(R³) wherein R¹ is a divalent hydrocarbon or halohydrocarbon group having from 2 to 20 carbon atoms, R² and R³ are independently selected from a group consisting of a hydrogen atom and a monovalent hydrocarbon group, and (C') a solvent. The reaction mixture can further comprise a base to trap any acidic by products generated during the reaction. Reacting is defined as described hereinabove.

The hydrolyzable group X can be a halogen atom exemplified by fluorine, chlorine, and bromine, an acyloxy group, a ketoxymate group, an amino group, an amido group, and an aminoxy group. Preferably X is chlorine. Preferably b has a value of 0.

The monovalent hydrocarbon groups for R and R⁴ are as described hereinabove including preferred embodiments thereof. Preferably R and R⁴ are methyl.

The alkylene groups of W(i) are exemplified by ethylene, propylene, butylene, pentylene, trimethylene, 2-methyltrimethylene, pentamethylene, hexamethylene, 3-ethyl-hexamethylene, octamethylene, and decamethylene.

The alkylene groups for R⁵ and R⁶ are as defined above for W(i). Preferably R⁵ and R⁶ are selected from the group consisting of ethylene and propylene. It is highly preferred that R⁵ is propylene, and R⁶ is ethylene. It is preferred that m have a value of 1.

Preferably, the polyisobutylene polymer of component (A') has a number average molecular weight of from 500 to 100,000, and especially from 1,000 to 20,000 based on their ease of handling.

Preferably, the polyisobutylene polymer of component (A') is a compound containing at least one group having the formula

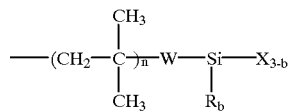

wherein n has a value from 10 to 2,000, X is a hydrolyzable group selected from the group consisting of a halogen atom, an acyloxy group, a ketoxymate group, an amino group, an amido group, and an aminoxy group, R is independently a monovalent hydrocarbon group, b has a value of 0 to 2, and W is selected from the group consisting of (i) an alkylene group having from 2 to 10 carbon atoms and (ii) a group having the formula

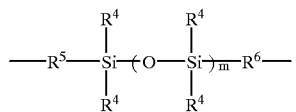

where $R^4$ is a monovalent hydrocarbon group, $R^5$ and $R^6$ are independently alkylene groups having from 2 to 10 carbon atoms, and m is an integer having a value of from 1 to 5.

Preferably X is chlorine, R is methyl, b has a value of 0, W(i) is selected from the group consisting of ethylene, propylene, butylene, pentylene, trimethylene, 2-methyltrimethylene, pentamethylene, hexamethylene, 3-ethyl-hexamethylene, octamethylene, and decamethylene.

Preferably $R^4$ is methyl. The alkylene groups for $R^5$ and $R^6$ are as defined above for W(i). Preferably $R^5$ and $R^6$ are selected from the group consisting of ethylene and propylene. It is highly preferred that $R^5$ is propylene, and $R^6$ is ethylene. It is preferred that m have a value of 1.

Component (B'), the alkenyl ether compound, is as described hereinabove in the second embodiment of this invention including preferred embodiments thereof. Preferably $R^1$ is butylene and $R^2$ and $R^3$ are hydrogen atoms.

Component (C') the solvent can be either a non-polar solvent or a polar solvent. The non-polar solvent is as described above in the second embodiment of this invention including preferred embodiments thereof. The polar solvent is exemplified by chloromethane, methylene chloride and mixtures thereof. The amount of solvent is not critical and may be readily determined by one skilled in the art. The compositions of this invention may contain up to 200 parts by weight of solvent per 100 parts by weight of Component (A'), however it is preferred that from about 50 to about 100 parts by weight be employed per 100 parts by weight of Component (A') be used.

The reaction mixture can further comprise a base exemplified by amines such as pyridine, triethylamine, tri-n-butylamine, and dodecyl amine.

It is preferred for purposes of this invention that the number of moles of the alkenyl ether compound, Component (B'), described above be equal to or slightly larger than the number of moles of Si-X groups in the polyisobutylene polymer (A').

The polyisobutylenes of this invention find utility as components in curable compositions in the form of coatings, sealants, caulks, adhesives and paints. These compositions can be applied to various substrates such as glass, metal cloth, fabric, paper, plastic and masonary. The curable compositions are preferably cured in form of films. The cured films are expected to have high refractive index, good barrier properties, good adhesion and good damping properties. It is preferable to apply these coatings to surfaces that are adversely affected by exposure to oxygen, moisture vapor and other environmental factors. The alkenyl ether functional polyisobutylenes are particularly useful as components in high refractive index coatings for optical fibers. The application of the radiation curable compositions containing the polyisobutylenes of this invention to optical fibers and curing of the compositions can be achieved by conventional equipment (see Blyler and Aloisio, Polymers for coating optical fibers, Chemtech, November 1987, pages 680–684). The curable compositions can also be used as an additive to compositions whose barrier properties needs to be tailored to higher values. The radiation curable compositions can used to increase the barrier properties of sealants and pottants used for encapsulating electronic devices that are adversely affected by moisture.

EXAMPLES

Materials: The allyl functional polyisobutylene (PIB) polymer was made by Kaneka Corporation and is called Epion™ 200A polymer. Hydroxybutyl vinyl ether, 1-dodecene, methyltrichlorosilane and methyldichlorosilane was purchased from Aldrich Chemical Company, as were other solvents and common reagents used in the examples. The platinum (vinylsiloxane) catalyst were prepared by the procedure of Hitchcock et. al., Angew. Chem. Int. Ed. Engl. 1991, 30. $^{13}$C and $^{29}$Si nuclear magnetic resonance spectroscopy was used to confirm the structures. The molecular weight of each polyisobutylene was determined by gel permeation chromatography (GPC) using standard PIB samples for molecular weight calibration. In the Examples hereinbelow, $M_n$ denotes number average molecular weight, and $M_w$ denotes weight average molecular weight.

Example 1

Production of methoxysilyl-functional polyisobutylene Polymer

The methoxysilyl-functional polyisobutylene polymers were prepared per the procedure disclosed by Saam et. al. in Example 2 of U.S. Pat. No. 4,808,664, except that the starting polyisobutylene polymer was the commercially available Epion™ 200A (an allyl telechelic polyisobutylene made by Kaneka Corporation, Tokyo, Japan).

Example 2

A mixture of 1112 g of the polymer from example 1 and 1500 ml of cyclohexane was added to a round bottom flask, equipped with mechanical stirrer, Dean-Stark separator, and reflux condenser. To the flask was added 140 grams of 4-hydroxybutyl vinyl ether (HO(CH$_2$)$_4$OCH=CH$_2$) and 0.5 ml of tetraisopropyl titanate. The reaction mixture was heated at a temperature of 70° C. with stirring for eight hours, during which time approximately 35 ml of methanol was removed from the Dean-Stark separator. Proton nuclear magnetic resonance spectrum of a small sample confirmed that the product had the following structure:

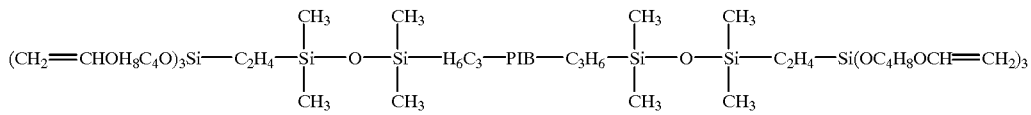

Note: PIB denotes the initial polyisobutylene polymer)

The cyclohexane solvent was removed by thin film stripper. Molecular weight data: $M_n=6800$; $M_w$ 10400; $M_w/M_n=1.52$

Example 3

Fifty grams of Epion™ 200A was dissolved in 150 ml of heptane. Platinum (vinylsiloxane) catalyst was added to the mixture at a molar ratio of $1\times10^{-4}$ equivalents/allyl group, and 1.10 (equivalents per allyl group)) of trichlorosilane was added dropwise to the reaction mixture. The reaction mixture was maintained for eight hours at 70° C. Proton nuclear magnetic resonance spectra confirmed the absence of allyl resonance. After cooling to room temperature 40 ml of methylene chloride was added to the flask followed by 15 g of triethylamine. Thereafter, 15 ml of 4-hydroxybutyl vinyl ether was added dropwise from an addition funnel to the flask and after addition the contents were allowed to stir overnight. The precipitated salts were filtered off. The polymer was isolated by precipitation into methanol and dried. Proton nuclear magnetic resonance spectra of the product confirms the following structure:

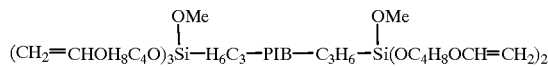

Molecular Weight data: $M_n=7528$, $M_w=35420$; $M_w/M_n=4.70$.

That which is claimed is:

1. An alkenyl ether-functional polyisobutylene polymer in which at least 50 mole percent of the non-terminal repeating units of the polymer are isobutylene units and containing at least one-group having the formula

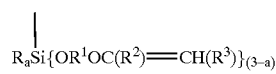

wherein R is independently selected from the group consisting of monovalent hydrocarbon groups and alkoxy groups, $R^1$ is a divalent hydrocarbon group having from 2 to 20 carbon atoms, $R^2$ and $R^3$ are independently selected from a group consisting of a hydrogen atom and a monovalent hydrocarbon group and a has a value of 0 to 2.

2. A polymer according to claim 1, wherein R is independently selected from the group consisting of methyl and methoxy, $R^1$ is butylene, $R^2$ and $R^3$ are each hydrogen atoms, and a has a value of zero.

3. A polymer according to claim 1, wherein the alkenyl ether functional polyisobutylene polymer is a polymer containing at least one group having the formula

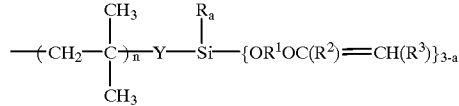

wherein at least 50 mole percent of the non-terminal repeating units of the polymer are isobutylene units, R is independently selected from the group consisting of monovalent hydrocarbon groups and alkoxy groups, $R^1$ is a divalent hydrocarbon group having from 2 to 20 carbon atoms, $R^2$ and $R^3$ are independently selected from a group consisting of a hydrogen atom and a monovalent hydrocarbon group, n has a value from 5 to 10,000, a has a value of 0 to 2, and Y is selected from the group consisting of (i) an alkylene group having from 2 to 10 carbon atoms and (ii) a group having the formula

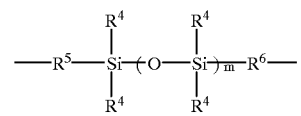

wherein $R^4$ is independently a monovalent hydrocarbon group, $R^5$ and $R^6$ are independently alkylene groups having from 2 to 10 carbon atoms, and m is an integer having a value of from 1 to 5.

4. A polymer according to claim 3, wherein R is independently selected from the group consisting of methyl and methoxy, $R^1$ is butylene, a has a value of 0 or 1, $R^2$ and $R^3$ are hydrogen atoms, and Y(i) is selected from the group consisting of ethylene, propylene, butylene, pentylene, trimethylene, 2-methyltrimethylene, pentamethylene, hexamethylene, 3-ethyl-hexamethylene, octamethylene, and decamethylene.

5. A polymer according to claim 3, wherein R is independently selected from the group consisting of methyl and methoxy, $R^1$ is butylene, a has a value of 0 or 1, $R^4$ is methyl, $R^5$ is propylene, $R^6$ is ethylene, and m has a value of 1.

6. A method of making an alkenyl ether functional polyisobutylene polymer in which at least 50 mole percent of the non-terminal repeating units of the polymer are isobutylene units, the method comprising (I) reacting a mixture comprising:

(A) a polyisobutylene polymer containing at least one group having the formula

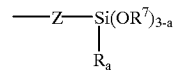

wherein at least 50 mole percent of the non-terminal repeating units of the polymer are isobutylene units, $R^7$ is an alkyl group having from 1 to 5 carbon atoms, R is independently a monovalent hydrocarbon group, a has a value of 0 to 2, and Z is selected from the group consisting of (i) an alkylene group having from 2 to 10 carbon atoms and (ii) a group having the formula

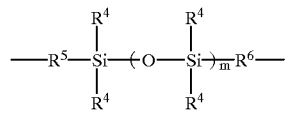

wherein $R^4$ is independently a monovalent hydrocarbon group, $R^5$ and $R^6$ are independently alkylene groups having from 2 to 10 carbon atoms, and m is an integer having a value of from 1 to 5;

(B) an alkenyl ether compound having the formula $HOR^1OC(R^2)=CH(R^3)$ wherein $R^1$ is a divalent hydrocarbon group having from 2 to 20 carbon atoms, $R^2$ and $R^3$ are independently selected from a group consisting of a hydrogen atom and a monovalent hydrocarbon group; and (C) a transesterification catalyst.

7. A method according to claim 6, wherein $R^2$ and $R^3$ are hydrogen atoms, $R^4$ is methyl, $R^5$ is propylene, $R^6$ is ethylene, $R^7$ is methyl, and m has a value of 1.

8. A method according to claim 6, wherein (A) is a polymer containing at least one group having the formula

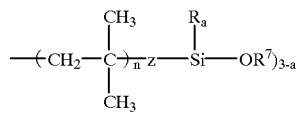

wherein R is independently a monovalent hydrocarbon group, $R^7$ is an alkyl group having from 1 to 5 carbon atoms, n has a value from 10 to 2,000, a has a value of 0 to 2, and Z is selected from the group consisting of (i) an alkylene group having from 2 to 10 carbon atoms and (ii) a group having the formula

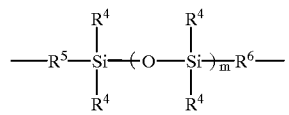

wherein $R^4$ is independently a monovalent hydrocarbon group, $R^5$ and $R^6$ are independently alkylene groups having from 2 to 10 carbon atoms, and m is an integer having a value of from 1 to 5.

9. A method according to claim 8, wherein R and $R^7$ are methyl, Z(i) is selected from the group consisting of ethylene, propylene, butylene, pentylene, trimethylene, 2-methyltrimethylene, pentamethylene, hexamethylene, 3-ethyl-hexamethylene, octamethylene, and decamethylene, and a has a value of 0.

10. A method according to claim 8, wherein R, $R^4$, and $R^7$ are methyl, $R^5$ is propylene, $R^6$ is ethylene, m has a value of 1, and a has a value of 0.

11. A method according to claim 6, wherein $R^1$ is butylene, and $R^2$ and $R^3$ are each hydrogen atoms.

12. A method according to claim 6, wherein (C) is selected from the group consisting of dimethyltin neodecanoate, dibutyltin diacetate, dibutyltin dilaurate, dioctyltin dilaurate, dibutyltin dioctoate, zinc napthenate, cobalt napthenate, zinc octylate, tin octylate, cobalt octylate, diisooctyl mercaptoacetate, zirconium napthenate, zirconium octylate, tetrabutyl titanate, tetraisopropyl titanate, and barium hydroxide monohydrate.

13. A method according to claim 6, wherein (C) is selected from the group consisting of tetraisopropyl titanate, barium hydroxide monohydrate, and sodium methoxide.

14. A method according to claim 6, wherein the mixture of step (I) further comprises a nonpolar solvent.

15. A method according to claim 14, wherein the nonpolar solvent is selected from the group consisting of pentane, cyclopentane, hexane, cyclohexane, heptane, octane, nonane, benzene, toluene, xylene, perchloroethylene, and bromobenzene.

16. A method according to claim 6, wherein the method of this invention further comprises removing volatiles from the product of (I).

17. A method according to claim 16, wherein removing the volatiles from the product of (I) comprises heating the product of (I) to a temperature of from 50 to 150° C. under a vacuum of approximately 20–100 mm Hg.

18. A method of making an alkenyl ether functional polyisobutylene polymer in which at least 50 mole percent of the non-terminal repeating units of the polymer are isobutylene units, the method comprising:

(I) reacting a mixture comprising:

(A') a polyisobutylene polymer containing at least one group having the formula

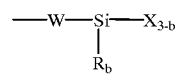

wherein at least 50 mole percent of the non-terminal repeating units of the polymer are isobutylene units, X is a hydrolyzable group selected from the group consisting of a halogen group, an acyloxy group, a ketoxymate group, an amino group, an amido group, and an aminoxy group, R is independently a monovalent hydrocarbon group, b has a value of 0 to 2, and W is selected from the group consisting of (i) an alkylene group having from 2 to 10 carbon atoms and (ii) a group having the formula

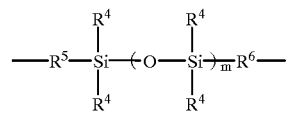

wherein $R^4$ is a monovalent hydrocarbon group, $R^5$ and $R^6$ are independently alkylene groups having from 2 to 10 carbon atoms, and m is an integer having a value of from 1 to 5;

(B') an alkenyl ether compound having the formula $HOR^1OC(R^2)=CH(R^3)$ wherein $R^1$ is a divalent hydrocarbon or halohydrocarbon group having from 2 to 20 carbon atoms, $R^2$ and $R^3$ are independently selected from a group consisting of a hydrogen atom and a monovalent hydrocarbon group; and (C') a solvent.

19. A method according to claim 18, wherein X is chlorine, R is methyl, b has a value of 0, and W(i) is selected from the group consisting of ethylene, propylene, butylene, pentylene, trimethylene, 2-methyltrimethylene, pentamethylene, hexamethylene, 3-ethyl-hexamethylene, octamethylene, and decamethylene.

20. A method according to claim 18, wherein X is chlorine group, R is methyl, b has a value of 0, $R^2$ and $R^3$ are hydrogen atoms, $R^4$ is methyl, $R^5$ is propylene, $R^6$ is ethylene, and m has a value of 1.

21. A method according to claim 18 wherein component (A') is a polymer containing at least one group having the formula

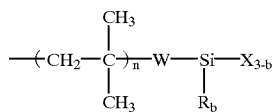

wherein n has a value from 10 to 2,000, X is a hydrolyzable group selected from the group consisting of a halogen atom, an acyloxy group, a ketoxymate group, an amino group, an amido group, and an aminoxy group, R is independently a monovalent hydrocarbon group, b has a value of 0 to 2, and W is selected from the group consisting of (i) an alkylene group having from 2 to 10 carbon atoms and (ii) a group having the formula

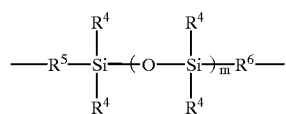

where $R^4$ is a monovalent hydrocarbon group, $R^5$ and $R^6$ are independently alkylene groups having from 2 to 10 carbon atoms, and m is an integer having a value of from 1 to 5.

22. A method according to claim 21, wherein X is chlorine, R is methyl, b has a value of 0, and W(i) is selected from the group consisting of ethylene, propylene, butylene, pentylene, trimethylene, 2-methyltrimethylene, pentamethylene, hexamethylene, 3-ethyl-hexamethylene, octamethylene, and decamethylene.

23. A method according to claim 21, wherein X is chlorine, R and $R^4$ are methyl, b has a value of 0, $R^5$ is propylene, $R^6$ is ethylene, and m has a value of 1.

24. A method according to claim 18, wherein $R^1$ is butylene, and $R^2$ and $R^3$ are hydrogen atoms.

25. A method according to claim 18, wherein the solvent is selected from the group consisting of polar solvents and non-polar solvents.

26. A method according to claim 25, wherein the non-polar solvent is selected from the group consisting of pentane, cyclopentane, hexane, cyclohexane, heptane, octane, nonane, benzene, toluene, xylene, perchloroethylene, and bromobenzene.

27. A method according to claim 25, wherein the polar solvent is selected from the group consisting of chloromethane, methylene chloride, and mixtures of chloromethane and methylene chloride.

28. A method according to claim 18, wherein the mixture of (I) further comprises a base.

29. A method according to claim 28, wherein the base is selected from the group consisting of pyridine, triethylamine, tri-n-butylamine, and dodecyl amine.

* * * * *